US005547735A

United States Patent [19]

Roebroeks et al.

[11] Patent Number: 5,547,735
[45] Date of Patent: Aug. 20, 1996

[54] IMPACT RESISTANT LAMINATE

[75] Inventors: Gerardus H. J. J. Roebroeks, Zuidzijde; Arthur C. Mattousch, Amsterdam, both of Netherlands

[73] Assignee: Structural Laminates Company, New Kensington, Pa.

[21] Appl. No.: 329,559

[22] Filed: Oct. 26, 1994

[51] Int. Cl.⁶ .................................................. B32B 5/12
[52] U.S. Cl. ......................... 428/110; 428/215; 428/220
[58] Field of Search ............................. 428/110, 215, 428/220

[56] References Cited

U.S. PATENT DOCUMENTS

| | | | |
|---|---|---|---|
| 4,615,166 | 10/1986 | Head | 52/309.11 |
| 5,039,571 | 8/1991 | Vogelesang et al. | 428/213 |
| 5,227,216 | 7/1993 | Pettit | 428/113 |
| 5,344,686 | 9/1994 | Heubert | 428/75 |

Primary Examiner—Christopher W. Raimund
Attorney, Agent, or Firm—Glenn E. Klepac

[57] ABSTRACT

A metal-polymer laminate has a bidirectional reinforcing layer containing about 45–70 vol. % high strength glass fibers. The bidirectional reinforcing layer includes a center layer containing glass fibers oriented generally parallel to a first direction; and first and second outer layers each reinforced with glass fibers oriented in a second direction extending generally transverse to the first direction. The bidirectional laminate is suitable for use in aircraft flooring and other applications requiring improved impact strength.

17 Claims, 1 Drawing Sheet

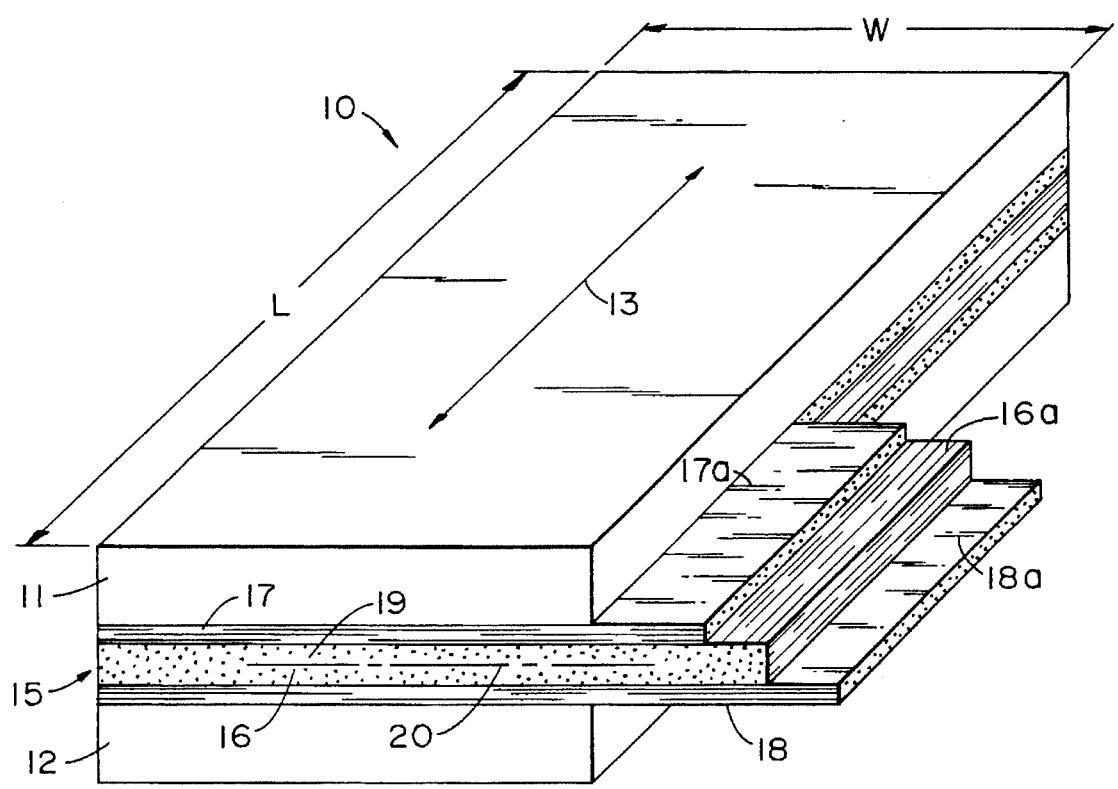

IMPACT RESISTANT LAMINATE

BACKGROUND OF THE INVENTION

1. Field of the Invention

The present invention relates to glass fiber reinforced metal-polymer laminates and more particularly to laminates for applications which require high impact strength.

2. Background Information

High performance materials are required for aircraft floors and fire wall liners in cargo areas. Some important properties for cargo floors are impact strength, bending stiffness, bearing properties and surface corrosion resistance. For fire walls, the important properties include fire resistance, bearing properties, abrasion resistance and impact strength.

Conventional aluminum alloy aircraft floors and glass fiber composite firewall liners (typically containing glass fiber weaves) require frequent repair or replacement due to their limited puncture resistance. Excessive abrasion damage and poor bearing properties are additional causes for frequent repair or replacement of panels made from glass fiber composites. In view of these shortcomings in the prior art, there remains a need for laminated panels having improved impact resistance.

It is a principal objective of the present invention to provide a metal-polymer laminate reinforced with bidirectional glass fibers and having improved impact resistance.

A related objective of the invention is to provide a laminate panel having satisfactory bending stiffness, bearing properties, surface corrosion resistance, fire resistance and abrasion resistance so that the panel will be useful for aircraft floors and fire wall liners.

Additional objectives and advantages of our invention will become apparent to persons skilled in the art from the following detailed description.

SUMMARY OF THE INVENTION

In accordance with the present invention, there is provided a glass fiber reinforced metal-polymer laminate comprising at least two metal sheets and a reinforcing layer between each of the metal sheets.

The metal sheets in the laminate may be of a metal selected from the following group: aluminum alloys, steel, titanium alloys, copper alloys and magnesium alloys. Preferably, at least one of the metal sheets comprises an aluminum-copper alloy of the AA2000 series or an aluminum-zinc alloy of the AA7000 series. Other suitable aluminum alloys are aluminum-manganese alloys of the AA3000 series, aluminum-magnesium alloys of the AA5000 series, and aluminum-magnesium-silicon alloys of the AA6000 series. Two preferred alloys are AA2X24-T3 and AA7X75-T6. When superior corrosion resistance is desired, a sheet of AA5052 alloy may be included in the laminate.

The aluminum alloy sheets may include a core or core layer that is coated on one or both sides with a metallurgically bonded thin layer of corrosion resistant pure aluminum or aluminum alloy. The cladding or cladding layer has a thickness of about 1.5 to 10% of the total sheet thickness. The combination of core and cladding layers can be selected so that the cladding layer is anodic to the core and provides electrochemical protection for the core at exposed edges and at abraded or corroded areas, under corrosive conditions. When a corrosive solution or other moist environment is in contact with the product, current from the anodic cladding flows through the electrolyte to the cathodic core and the cladding is dissolved, thereby protecting the core.

The metal sheets have a tensile strength of greater than about 0.20 GPa (29 ksi), preferably greater than about 0.35 GPa (51 ksi).

The metal sheets each have a thickness of less than about 0.8 mm, preferably about 0.1–0.7 mm, and more preferably about 0.2–0.6 min. Aluminum alloy sheets having a thickness of about 0.4–0.6 mm are most preferred. In a particularly preferred embodiment, the metal sheet thickness is about 0.51 mm (0.020 inch). The number of metal sheets may range from 2 to 4. Laminates containing two metal sheets are particularly preferred.

A reinforcing layer is provided between each pair of metal sheets. The reinforcing layer comprises a synthetic polymeric material reinforced with about 45–70 vol. % glass fibers. The synthetic resin is preferably a thermosetting material such as an epoxy resin, unsaturated polyester resin, vinyl ester or phenolic resin. Epoxy resins are especially preferred. Some suitable thermoplastics include polyarylates (PAR), polysulphones (PSO), polyethersulphones (PES), polyetherimides (PEI) and polyphenylene ethers (PPE). Thermoplastic materials suitable for higher temperature applications have a glass transition temperature Tg higher than 130° C. Such high temperature thermoplastics include polyphenylene sulphide (PPS), polyether ketones (PEK), polyether-ether ketones (PEEK), polyether ketone-ketones (PEKK), and liquid crystal polymers such as Xydar.

The total thickness of the reinforcing layer is about 0.1–1.5 mm, preferably about 0.2–1.0 mm and more preferably about 0.4–0.7 mm. In a particularly preferred embodiment, the reinforcing layer has a thickness of about 0.51 mm (0.020 inch).

The reinforcing layer is reinforced with high strength glass fibers. The preferred fibers are S-2 glass or R-glass fibers each containing about 58–69 wt. % $SiO_2$, 18–29 wt. % $Al_2O_3$ and 7–19 wt. % MgO. More preferably, the glass fibers contain about 60–65 wt. % $SiO_2$, 20–25 wt. % $Al_2O_3$ and 9–15 wt. % MgO. A particularly preferred embodiment utilizes S-2 glass fibers containing about 65 wt. % $SiO_2$, 25 wt. % $Al_2O_3$ and 10 wt. % MgO. These glass fibers have a tensile strength of about 4–6 GPa (580–870 ksi).

The glass fibers are preferably filaments having a diameter of about 5–25 microns, more particularly about 8–12 microns. The particularly preferred glass fibers have a nominal diameter of about 9 microns.

The glass fibers make up about 45–70 vol. % of the reinforcing layer, preferably about 50–65 vol. % and more preferably about 55–60 vol. %. A particularly preferred laminate contains about 57 vol. % glass fibers in the reinforcing layer.

Each reinforcing layer comprises at least three layers—a center layer, a first outer layer between the center layer and a first metal sheet, and a second outer layer between the center layer and a second metal sheet. The center layer contains glass fibers at least a majority of which are oriented in a first direction. In the broadest aspect of the invention, the first direction is not restricted to any particular orientation. In both the first and second outer layers, at least a majority of the fibers extend generally parallel to a second direction which is generally perpendicular to the first direction. About half of all of the fibers in the reinforcing layer are oriented in the first direction and about half in the second direction.

The center layer preferably comprises about 45–55 vol. % of the reinforcing layer, and each outer layer comprises about 20–30 vol. %. More preferably, the center layer comprises about 48–52 vol. % and the outer layers each about 24–26 vol. %. In a preferred embodiment, the center layer comprises about 50 vol. % and each outer layer about 25 vol. % of the reinforcing layer.

In a preferred laminate, the center layer and the first and second outer layers each contain generally continuous, unidirectional fibers. For example, substantially all of the fibers in the center layer of a generally rectangular laminate are oriented parallel to the longer direction (length) of the laminate and substantially all of the fibers in the two outer layers are oriented parallel to the shorter direction (width). The length of the rectangular laminate will generally be aligned with the rolling direction of the metal sheets, although such alignment is not essential to the claimed invention.

In a preferred embodiment, the center layer contains a single 0.010 inch (0.25 mm) ply of an epoxy resin reinforced with about 57 vol. % S-2 glass fibers, and the outer layers each contain a single ply having a thickness of about 0.005 inch. Alternatively, the center layer may contain two plies and the outer layers one ply, each ply having a thickness of about 0.005 inch (0.13 mm). The center layer glass fibers and the two outer layer glass fibers are oriented transversely to each other. Accordingly, the preferred laminate has a symmetrical, bidirectional glass fiber configuration between each set of metal sheets.

BRIEF DESCRIPTION OF THE DRAWINGS

The sole FIGURE is a fragmentary perspective view of a preferred embodiment of the bidirectional laminate of the invention.

DETAILED DESCRIPTION OF THE PREFERRED EMBODIMENTS

A particularly preferred bidirectional laminate 10 made in accordance with the present invention is shown in the Figure. The laminate 10 includes two sheets 11, 12 of an AA2024-T3 type aluminum-copper alloy, each having a thickness of about 0.51 mm (0.020 inch). The sheets 11, 12 are generally rectangular, with the longer direction or length L extending generally parallel to the rolling direction 13 and the shorter direction or width W extending generally perpendicular to the rolling direction 13.

A reinforcing layer 15 joins the two metal sheets 11, 12. The reinforcing layer 15 includes three parts—a center layer 16; a first outer layer 17 between the center layer 16 and the first metal sheet 11; and a second outer layer 18 between the center layer 16 and the second metal sheet 12. The center layer 16 has a thickness of about 0.25 mm (0.010 inch ) and the outer layers 17, 18 each have a thickness of about 0.13 mm (0.005 inch). The reinforcing layer 15 has a total thickness of about 0.51 mm (0.020 inch).

The reinforcing layer 15 has a matrix 19 of thermosetting epoxy resin, preferably a metal adhesive.

The reinforcing layer 15 is reinforced with high strength glass fibers marketed under the trademark S-2. The S-2 glass fibers have a modulus of elasticity of about 88.5 GPa (12,800 ksi); a tensile strength of about 4.7 GPa (680 ksi); elongation at rupture of about 4.6% and a density of about 2.5 g/cm$^3$. Nominal diameter of the glass fibers is about 9 microns. All three parts 16, 17, 18 of the reinforcing layer contain about 57 vol. % of the glass fibers and about 43 vol. % of the epoxy resin.

In a particularly preferred embodiment, the outer layers 17, 18 are each made up of a single ply having a thickness of about 0.005 inch (0.13 mm). The center layer 16 contains a single ply of the same material having a total thickness of 0.010 inch (0.25 mm).

The laminate 10 has a bidirectional orientation and symmetrical arrangement of glass fibers in the reinforcing layer 15. The reinforcing layer 15 is termed "bidirectional" because glass fibers 16a in the center layer 16 extend generally transversely to glass fibers 17a, 18a in the two outer layers 17, 18. In the particularly preferred embodiment shown in the Figure, the center layer glass fibers 16a are continuous, unidirectional fibers extending generally parallel to the rolling direction 13, and the outer layer glass fibers 17a, 18a are continuous, unidirectional fibers extending generally parallel to the width W. The arrangement of glass fibers in the reinforcing layer 15 is called "symmetrical" because on either side of the midplane 20 of the reinforcing layer 15 at locations equidistant from the midplane 20, glass fibers can be found extending in the same direction.

Laminated panels made in accordance with the invention are suitable for use as aircraft flooring and fire wall liners. Aircraft floor panels of the invention generally have a length of at least about 1 meter (39.4 inches), preferably greater than about 3 meters (118 inches). One suitable aircraft floor panel that we developed has dimensions of 3.66 meters×1.22 meters (12 feet×4 feet).

Alternatively, a laminate can be made in accordance with the invention with two AA2024-T3 aluminum-copper alloy sheets having a thickness of about 0.3 mm (0.012 inch) and a reinforcing layer having a thickness of about 0.51 mm (0.020 inch). This alternative laminate is not shown in the drawings.

Laminates of the invention are manufactured from metal sheets, preferably aluminum alloy sheets, which are subjected to an alkaline degreasing treatment followed by either etching in a chromic acid-sulfuric acid bath or anodizing in chromic acid, phosphoric acid, or an organophosphonic acid such as vinyl phosphonic acid. A primer is then applied to surfaces of the metal sheets which will contact the reinforcing layer.

A prepreg is then interposed between each set of primed metal sheets. A preferred prepreg includes three plies of S-2 glass fibers in an epoxy matrix, arranged symmetrically and bidirectionally as shown in the Figure. The laminate is then placed in an autoclave and heated under increased pressure and at an elevated temperature. For example, heating at an air pressure of 5 bars at 120° C. for 66 minutes produces a suitable laminate when the reinforcing layer has an epoxy matrix. The completed laminate is then cooled and removed from the autoclave.

Two laminates of the invention were tested for impact resistance and other properties against a prior art fiber-metal laminate and monolithic AA2024-T3 sheets.

The 3/2 prior art laminate was made with a bare 2024-T3 inner sheet and two outer sheets of 2024-T3 alloy clad on both sides with AA1230 aluminum. All three sheets had a thickness of about 0.3 mm (0.012 in) and the two reinforcing layers had a thickness of about 0.25 mm (0.010 in). The bidirectional reinforcing layers each contained one 0.005 inch thick ply having continuous, unidirectional S-2 glass fibers oriented at 0° (parallel to the laminate length) and one 0.005 inch thick ply having continuous, unidirectional S-2 glass fibers oriented at 90° (perpendicular) to the length. The prior art laminate is called "Laminate 1" in Tables 1 and 2.

The 2/1 laminates of the invention each contained two metal sheets having a thickness of 0.51 mm (0.020 in) and a reinforcing layer of 0.51 mm (0.020 in) thickness. Laminate 2 was made with one sheet of bare 5052-H34 alloy and one bare 2024-T3 sheet. Laminate 3 contained two sheets of 2024-T3 alloy clad on both sides with AA1230 aluminum. The reinforcing layer had a center layer of 0.010 inch thickness with S-2 glass fibers oriented at 0° to the length L and two outer layers of 0.005 inch thickness, each with S-2 glass fibers oriented at 90° to the length L, all as shown in the Figure.

Two sets of impact resistance tests were performed. A first set of tests utilized 5 in×5 in (13 cm×13 cm) samples and a second set of tests was performed on 16 in×16 in (41 cm×41 cm) samples. The test results are shown below in Tables 1 and 2.

TABLE 1

Impact Resistance Tests on 5 in × 5 in Samples

| Structure | Thickness (in) | Impact Resistance (ft-lb) | Specific Impact Resistance (ft$^3$) | Improvement Over Laminate 1 (%) | Improvement Over 2024-T3 (%) |
|---|---|---|---|---|---|
| Laminate 1 (prior art) | 0.056 | 16 | 22 | — | 5 |
| Laminate 2 | 0.060 | 26 | 34 | 55 | 62 |
| Laminate 3 | 0.060 | 26 | 34 | 55 | 62 |
| 2024-T3 | 0.063 | 20 | 21 | −5 | — |

TABLE 2

Impact Resistance Tests on 16 in × 16 in Samples

| Structure | Thickness (in) | Impact Resistance (ft-lb) | Specific Impact Resistance (ft$^3$) | Improvement Over Laminate 1 (%) | Improvement Over 2024-T3 (%) |
|---|---|---|---|---|---|
| Laminate 1 (prior art) | 0.056 | 37 | 52 | — | 68 |
| Laminate 2 | 0.060 | 46 | 60 | 12 | 94 |
| Laminate 3 | 0.060 | 46 | 60 | 12 | 94 |
| 2024-T3 | 0.063 | 29 | 31 | −68 | — |

The term "specific impact resistance" appearing in Tables 1 and 2 refers to the calculated impact resistance of specimens having constant weight per unit area. This term is expressed in ft$^3$ because the weight is constant.

Surprisingly, the laminates of the present invention demonstrated a 55% improvement in specific impact resistance over the prior art laminate on 5 in×5 in specimens and a 12% improvement on 16 in×16 in specimens. In addition, the 5 in×5 in symmetrical laminate specimens were 62% better and the 16 in×16 in symmetrical laminate specimens were 94% better than 2024-T3 aluminum alloy specimens on this test. Laminates of the present invention having 0.060 in total thickness also offer a 16% weight saving over monolithic 0.063 inch thick 2024-T3 aluminum alloy sheets.

The impact test results summarized above are surprising because neither the aluminum sheets nor the reinforcing layer alone have satisfactory impact properties. Only the combination of aluminum sheets and a symmetrical, bidirectional reinforcing layer described and claimed herein provides superior impact strength together with other commercially acceptable properties.

What is believed to be the best mode of the invention has been described above. However, it will be apparent to those skilled in the art that these and other changes of the type described could be made to the present invention without departing from the spirit of the invention. The scope of the present invention is indicated by the broad general meaning of the terms in which the claims are expressed.

What is claimed is:

1. A glass fiber reinforced laminate comprising:
    (a) at least two metal sheets each having a thickness of about 0.1–0.8 mm and a tensile strength of greater than about 0.20 GPa, at least one of said metal sheets comprising an aluminum alloy of the AA2000 series or 7000 series and at least one of said metal sheets comprising an aluminum alloy of the AA5000 or 6000 series; and
    (b) a reinforcing layer having a thickness of about 0.1–1.5 mm between said metal sheets and comprising a synthetic polymeric material reinforced with about 45–70 vol. % high strength glass fibers having a tensile strength of at least about 4 GPa, said reinforcing layer comprising:
        (i) a center layer comprising glass fibers at least a majority of which are oriented generally parallel to a first direction; and
        (ii) a first outer layer between said center layer and a first metal sheet and a second outer layer between said center layer and a second metal sheet, said first and second outer layers each containing glass fibers at least a majority of which are oriented in a second direction generally transverse to said first direction; and
    wherein about half of the glass fibers in said reinforcing layer are oriented in said first direction and about half are oriented in said second direction.

2. A laminate as set forth in claim 1 wherein said glass fibers are non-woven, have a tensile strength of about 4–6 GPa and comprise about 58–69 wt. % SiO$_2$, about 18–29 wt. % Al$_2$O$_3$ and about 7–19 wt. % MgO.

3. A laminate as set forth in claim 1 wherein substantially all of the glass fibers in said center layer and in said first and second outer layers are unidirectional.

4. A laminate as set forth in claim 3 wherein said center layer and said outer layers each comprise a single ply of an epoxy matrix reinforced with generally continuous glass fibers.

5. A laminate as set forth in claim 3 wherein said center layer comprises about one-half and each said outer layers comprise about one-fourth of the reinforcing layer.

6. A laminate as set forth in claim 1 wherein said glass fibers comprise about 50–65 vol. % of the reinforcing layer.

7. A laminate as set forth in claim 1 wherein said glass fibers are non-woven, have a tensile strength of about 4–6 GPa and comprise about 55–60 vol. % of the reinforcing layer.

8. A laminate as set forth in claim 1 wherein at least one of said metal sheets comprises an aluminum alloy of the AA7000 series and at least one of said metal sheets comprises an aluminum alloy of the AA5000 series.

9. A laminate as set forth in claim 1 wherein each of said metal sheets has a thickness of about 0.2–0.7 mm.

10. A laminate as set forth in claim 1 wherein each of said metal sheets has a thickness of about 0.4–0.6 mm.

11. A laminate as set forth in claim 1 wherein each of said metal sheets has a thickness of about 0.2–0.6 mm and said reinforcing layer has a thickness of about 0.4–0.7 mm.

12. A laminate as set forth in claim 1 wherein said laminate is generally rectangular and has a length and a width, said first direction is generally parallel to said length or said width, and said second direction is generally perpendicular to said first direction.

13. A laminate as set forth in claim 1 consisting of two aluminum alloy sheets each having a thickness of about 0.4–0.6 mm and a single reinforcing layer between the sheets having a thickness of about 0.4–0.7 mm and comprising an epoxy matrix reinforced with about 50–65 vol. % glass fibers.

14. A metal-polymer laminate reinforced with bidirectional glass fibers and having improved impact strength, said laminate comprising:
  (a) at least two 0.1–0.7 mm thick aluminum alloy sheets, at least one of said sheets comprising an aluminum alloy of the AA2000 or 7000 series and at least one of said sheets comprising an aluminum alloy of the AA5000 or 6000 series;
  (b) a reinforcing layer between each said aluminum alloy sheets and comprising a polymeric adhesive material reinforced with about 45–70 vol. % non-woven glass fibers having a tensile strength of about 4–6 GPa, said reinforcing layer having a thickness of about 0.2–1 mm and comprising at least two layers of generally continuous, unidirectional glass fibers, about half of said glass fibers being oriented in a first direction and about half of said glass fibers being oriented in a second direction generally transverse to said first direction.

15. An aircraft floor comprising at least one laminate in accordance with claim 14 and having a length of at least about 1 meter.

16. The laminate of claim 14 wherein the aluminum alloy sheets have a thickness of about 0.4–0.6 mm and the reinforcing layer comprises an epoxy resin matrix and has a thickness of about 0.4–0.6 mm.

17. A fiber reinforced metal-polymer laminate consisting essentially of:
  (a) two aluminum alloy sheets each having a thickness of about 0.2–0.6 mm wherein one of said sheets comprises an aluminum alloy of the AA2000 or 7000 series and one of said sheets comprises an aluminum alloy of the AA5000 or 6000 series;
  (b) a reinforcing layer between the two sheets having a thickness of about 0.2–1.0 mm and comprising an epoxy adhesive matrix reinforced with about 50–65 vol. % non-woven, generally continuous glass fibers having a diameter of about 5–25 microns and a tensile strength of about 4–6 GPa, said reinforcing layer comprising:
    (i) a center layer containing unidirectional glass fibers oriented in a first direction; and
    (ii) a first outer layer between said center layer and a first sheet and a second outer layer between said center layer and a second sheet, said first and second outer layers each containing unidirectional glass fibers oriented in a second direction generally transverse to said first direction.

* * * * *